(12) United States Patent
Xiong et al.

(10) Patent No.: US 9,710,098 B2
(45) Date of Patent: Jul. 18, 2017

(54) METHOD AND APPARATUS TO REDUCE LATENCY OF TOUCH EVENTS

(71) Applicant: SAMSUNG DISPLAY CO., LTD., Yongin, Gyeonggi-Do (KR)

(72) Inventors: Wei Xiong, Mountain View, CA (US); Frank Seto, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 15 days.

(21) Appl. No.: 14/663,399

(22) Filed: Mar. 19, 2015

(65) Prior Publication Data
US 2015/0277653 A1    Oct. 1, 2015

Related U.S. Application Data

(60) Provisional application No. 61/973,149, filed on Mar. 31, 2014.

(51) Int. Cl.
| | | |
|---|---|---|
| *G06F 3/041* | (2006.01) | |
| *G06K 9/46* | (2006.01) | |
| *G06K 9/62* | (2006.01) | |
| *H04N 5/265* | (2006.01) | |
| *H04N 7/18* | (2006.01) | |
| *G06F 3/0488* | (2013.01) | |
| *G06T 11/20* | (2006.01) | |

(52) U.S. Cl.
CPC .......... *G06F 3/0416* (2013.01); *G06F 3/0414* (2013.01); *G06F 3/0488* (2013.01); *G06K 9/4604* (2013.01); *G06K 9/6267* (2013.01); *G06T 11/203* (2013.01); *H04N 5/265* (2013.01); *H04N 7/18* (2013.01)

(58) Field of Classification Search
CPC .. G06F 3/0416; G06F 3/04883; G06F 3/0488; G06F 3/041; G06F 3/0418; G06F 3/0412; G06F 3/044; G09G 2320/0252
USPC .................................. 345/173, 174; 715/863
See application file for complete search history.

(56) References Cited

U.S. PATENT DOCUMENTS

| | | |
|---|---|---|
| 8,184,102 B2 | 5/2012 | Park et al. |
| 2004/0196255 A1 | 10/2004 | Cheng |

(Continued)

FOREIGN PATENT DOCUMENTS

| | | |
|---|---|---|
| KR | 10-2011-0138095 A | 12/2011 |
| KR | 10-2013-0050606 A | 5/2013 |

OTHER PUBLICATIONS

EPO Search Report dated Aug. 24, 2015, for corresponding European Patent application 15160947.6, (11 pages).

(Continued)

*Primary Examiner* — Koosha Sharifi-Tafreshi
(74) *Attorney, Agent, or Firm* — Lewis Roca Rothgerber Christie LLP

(57) ABSTRACT

A system includes: a touch path module to receive a plurality of touch events and to generate an output based on the touch events; and a rendering module to: receive a video image; receive the output of the touch path module; determine a plurality of points defining a boundary of a shape, the shape being determined based on the output of the touch path module; combine the video image with overlay data in accordance with the plurality of points to generate a combined display image; and output the combined display image.

17 Claims, 13 Drawing Sheets

(56) References Cited

U.S. PATENT DOCUMENTS

| | | | |
|---|---|---|---|
| 2010/0277429 A1* | 11/2010 | Day | G06F 3/0416 |
| | | | 345/173 |
| 2011/0298807 A1* | 12/2011 | Kim | G06T 11/203 |
| | | | 345/442 |
| 2011/0304643 A1* | 12/2011 | Marison | G06F 3/04883 |
| | | | 345/611 |
| 2013/0091449 A1* | 4/2013 | Tu | G06F 3/04883 |
| | | | 715/765 |
| 2013/0201112 A1* | 8/2013 | Large | G06F 3/04883 |
| | | | 345/173 |
| 2013/0265239 A1 | 10/2013 | Parekh et al. | |
| 2013/0271487 A1* | 10/2013 | Lincoln | G06F 3/03545 |
| | | | 345/619 |
| 2013/0293554 A1 | 11/2013 | Vostrikov et al. | |
| 2014/0098072 A1* | 4/2014 | Singh | G06F 3/044 |
| | | | 345/179 |
| 2014/0143692 A1* | 5/2014 | Wigdor | G06F 3/0488 |
| | | | 715/764 |
| 2015/0062021 A1* | 3/2015 | Skaljak | G06F 3/04883 |
| | | | 345/173 |

OTHER PUBLICATIONS

Ng, A., et al., *Designing for Low-Latency Direct-Touch Input General terms: Design, Human Factors*, Proceedings of UIST '12, Oct. 7, 2012, pp. 453-463, XP055141925.

* cited by examiner

METHOD AND APPARATUS TO REDUCE LATENCY OF TOUCH EVENTS

CROSS-REFERENCE TO RELATED APPLICATION(S)

This application claims priority to and the benefit of U.S. Provisional Patent Application No. 61/973,149, titled "MEMORY-EFFICIENT METHOD AND APPARATUS TO REDUCE DISPLAY LATENCY OF TOUCH EVENTS," filed in the United States Patent and Trademark Office on Mar. 31, 2014, the entire disclosure of which is incorporated herein by reference.

BACKGROUND

1. Field

Embodiments of the present invention relate to display devices with touch input devices and, more specifically, systems and methods for reducing display lag between the touch input device and the display device.

2. Related Art

Display panels incorporating or coupled to overlaid touch sensor panels provide an interaction system for touch-enabled computing devices (such as mobile phones, tablet computers, laptop computers, or desktop computers). In such computing devices, graphics are displayed on the display panel and a user can interact with these devices by touching the screen (e.g., using an active stylus, a passive stylus, or a body part such as a finger), thereby providing an intuitive user interface.

Touch events detected by the touch sensor panels are typically processed by high level application software running on an application processor (AP) of the device. The many processing operations between the touch sensor panel and the AP and the non-deterministic processing time on the AP (including delays due to other computational tasks being performed by the AP) introduce high levels of latency (e.g., 70 to 100 milliseconds) that reduce responsiveness of the computing device to the user's touch inputs.

SUMMARY

Aspects of embodiments of the present invention are directed to reducing the latency between a touch event and the display response to this touch event.

According to one embodiment of the present invention, a system includes: a touch path module to receive a plurality of touch events and to generate an output based on the touch events; and a rendering module to: receive a video image; receive the output of the touch path module; determine a plurality of points defining a boundary of a shape, the shape being determined based on the output of the touch path module; combine the video image with overlay data in accordance with the plurality of points to generate a combined display image; and output the combined display image.

The combined display image may include a plurality of rows, wherein each of the points includes a row coordinate, the rendering module being further to: classify the points as one or more of left-edge points and right-edge points; sort the left-edge points by the row coordinate; and sort the right-edge points by the row coordinate, and the rendering module further, for a current row of the plurality of rows of the combined display image, to: determine a start entry based on an left intersection between the current row and a left edge defined by a first left-edge point of the left-edge points and a second left-edge point of the left-edge points; determine a stop entry based on a right intersection between the current row and a line defined by a first right-edge point of the right-edge points and a second right-edge point of the right-edge points; generate a row mask including a plurality of entries for the current row based on the start entry and the stop entry; and combine the video image with the overlay data for the current row in accordance with the row mask.

The current row may include a plurality of entries, wherein each of the entries of the row mask has a first mask value or a second mask value, the rendering module may further, for each entry of the current row: output the overlay data when a corresponding entry of the row mask has the first value; and output the video image when the corresponding entry of the row mask has the second value.

Each of the entries of the row mask between the start entry and the stop entry may have the first mask value.

The system may further include a memory to store the left-edge points and the right-edge points in a lookup table.

The rendering module may be further to determine the plurality of points defining the boundary of the shape based on a line width parameter.

The touch events may include touch pressure information, and wherein the rendering module may be further configured to determine the plurality of points defining the boundary of the shape based on the touch pressure information.

According to one embodiment of the present invention, a method for combining overlay data with a video image includes: receiving the video image; receiving a touch path from a touch path module; determining a plurality of points defining a boundary of a shape, the shape being determined based on the touch path; combining the video image with the overlay data to generate a combined display image; and outputting the combined display image.

The combined display image may include a plurality of rows, wherein each of the points includes a row coordinate, and wherein the method may further include: classifying the points as one or more of left-edge points and right-edge points; sorting the left-edge points by the row coordinate; sorting the right-edge points by the row coordinate; determining a start entry for a current row of the rows based on a left intersection between the current row and a left edge defined by a first left-edge point of the left-edge points and a second left-edge point of the left-edge points; determining a stop entry for the current row based on a right intersection between the current row and a right edge defined by a first right-edge point of the right-edge points and a second right-edge point of the right-edge points; generating a row mask including a plurality of entries for the current row based on the start entry and the stop entry; and combining the video image with the overlay data for the current row in accordance with the row mask.

The current row may include a plurality of entries, wherein each of the entries of the row mask has a first mask value or a second mask value, and the combining the video image with the overlay data may include, outputting the overlay data when a corresponding entry of the row mask has the first value; and outputting the video image when the corresponding entry of the row mask has the second value.

Each of the entries of the row mask between the start entry and the stop entry may have the first mask value.

The method may further include storing the left-edge points and the right-edge points in a lookup table.

The method may further include determining the plurality of points defining the boundary of the shape based on a line width parameter.

The touch path may include touch pressure information, and the method may further include determining the plurality of points defining the boundary of the shape based on the touch pressure information.

According to one embodiment of the present invention, a system includes: a touch panel; a display panel; an application processor; a touch path module to receive a plurality of touch events from the touch panel and to generate an output based on the touch events; and a rendering module to: receive a video image from the application processor; receive the output of the touch path module; determine a plurality of points defining a boundary of a shape, the shape being determined based on the output of the touch path module; combine the video image with overlay data in accordance with the plurality of points to generate a combined display image; and output the combined display image to the display panel.

The combined display image may include a plurality of rows, wherein each of the points includes a row coordinate, the rendering module may be further configured to: classify the points as one or more of left-edge points and right-edge points; sort the left-edge points by the row coordinate; and sort the right-edge points by the row coordinate, and the rendering module may further, for a current row of the plurality of rows of the combined display image: determine a start entry based on an left intersection between the current row and a left edge defined by a first left-edge point of the left-edge points and a second left-edge point of the left-edge points; determine a stop entry based on a right intersection between the current row and a line defined by a first right-edge point of the right-edge points and a second right-edge point of the right-edge points; generate a row mask including a plurality of entries for the current row based on the start entry and the stop entry; and combine the video image with the overlay data for the current row in accordance with the row mask.

The current row may include a plurality of entries, wherein each of the entries of the row mask has a first mask value or a second mask value, the rendering module may be further configured to, for each entry of the current row: output the overlay data to the display panel when a corresponding entry of the row mask has the first value; and output the video image to the display panel when the corresponding entry of the row mask has the second value, wherein each of the entries of the row mask between the start entry and the stop entry has the first mask value.

The system may further include a memory to store the left-edge points and the right-edge points in a lookup table.

The rendering module may be further to determine the plurality of points defining the boundary of the shape based on a line width parameter received from the application processor.

The touch events may further include touch pressure information, and the rendering module may be further configured to determine the plurality of points defining the boundary of the shape based on the touch pressure information.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1B:
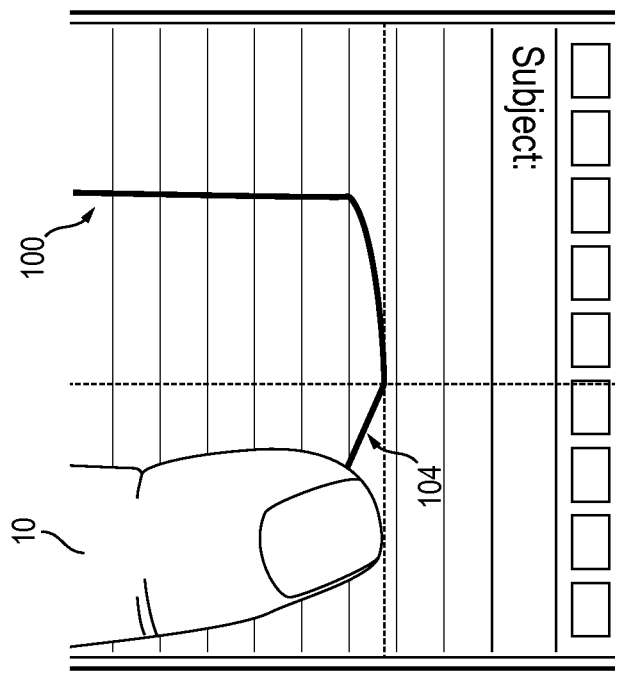
FIG. 1B illustrates the response of a device including a touch input processing device according to embodiments of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration. As used herein, the terms "use," "using," and "used" may be considered synonymous with the terms "utilize," "utilizing," and "utilized," respectively. When a first element is described as being "coupled" or "connected" to a second element, the first element may be directly "coupled" or "connected" to the second element, or one or more other intervening elements may be located between the first element and the second element.

Embodiments of the present invention allow a user to perceive a faster touch response by displaying an image based on the touch locations in advance of the application processor rendered image.

Software designed for touch interfaces often utilize a metaphor of direct physical manipulation of pseudo "real-world" objects and/or the drawing of paths on the screen to provide visual feedback (e.g., for the trace of a finger on a swiping or gesture-based on-screen keyboard, for the trace of a path in a drawing or sketchbook application, and for a path drawn in a game).

A common issue of mobile phones is the lag (or lag time or latency) of the user interface (UI). Current mobile phones typically take 50 to 200 milliseconds to update the display in response to a touch action. For example, the typical display response time to a touch event as measured on a related art smart phone may be more than 100 milliseconds or roughly over 6 frames of video images, based on a refresh rate of 60 frames per second (FPS), which is noticeable by a large portion of users.

Figure 1A:
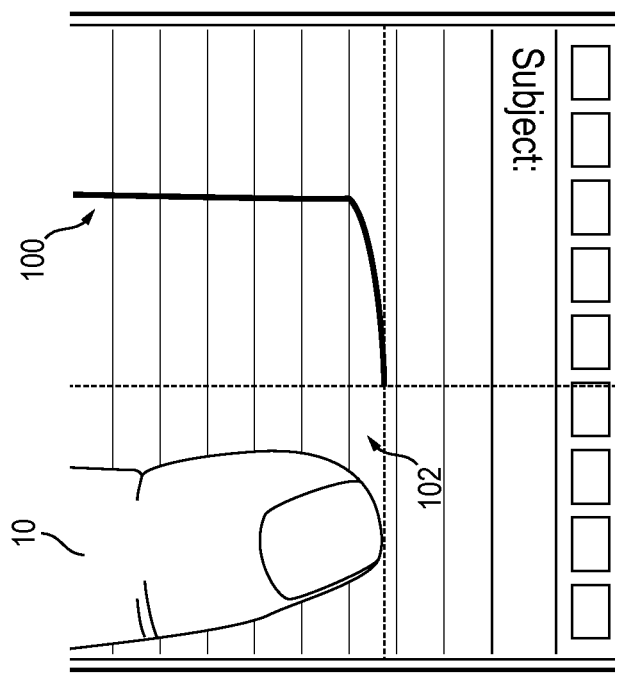
FIG. 1A illustrates the response of a device including a related art touch input processing device.

FIG. 1A illustrates the response of a device including a related art touch input processing device, where the displayed line 100 has a gap 102 between the position of a finger and the last drawn portion of the displayed line 100. The gap 102 causes a noticeable display lag between the user's touch and the displayed line. Similar display lag is also typically encountered when using a stylus, whether active or passive.

Embodiments of the present invention allow the user to perceive a faster touch response by overlaying an image in the touch path in advance of the AP rendered image. By closing the gap between the user's touch point (whether using a finger, stylus, or other implement) and the drawing of the line on the screen, the perceived display lag can be decreased. As used herein, the term "overlay" when used as a verb refers to combining video images (e.g., a AP rendered image) and additional image data such that the additional image data replaces (or "overlays") some portion of the original video images. The term "overlay" when used as a noun may also refer to the appearance of that additional image data in the combined display image.

In addition, by using an overlay method, application software can also control the region (e.g., location on the display), color, and rendering operation of the displayed response to a touch event.

FIG. 1B illustrates the displayed response of a device including a touch input processing device according to embodiments of the present invention, where the displayed line includes an estimated or computed portion 104 that is drawn by a low latency overlay system according to embodiments of the present invention, thereby reducing the display lag perceived by the user.

Figure 2:
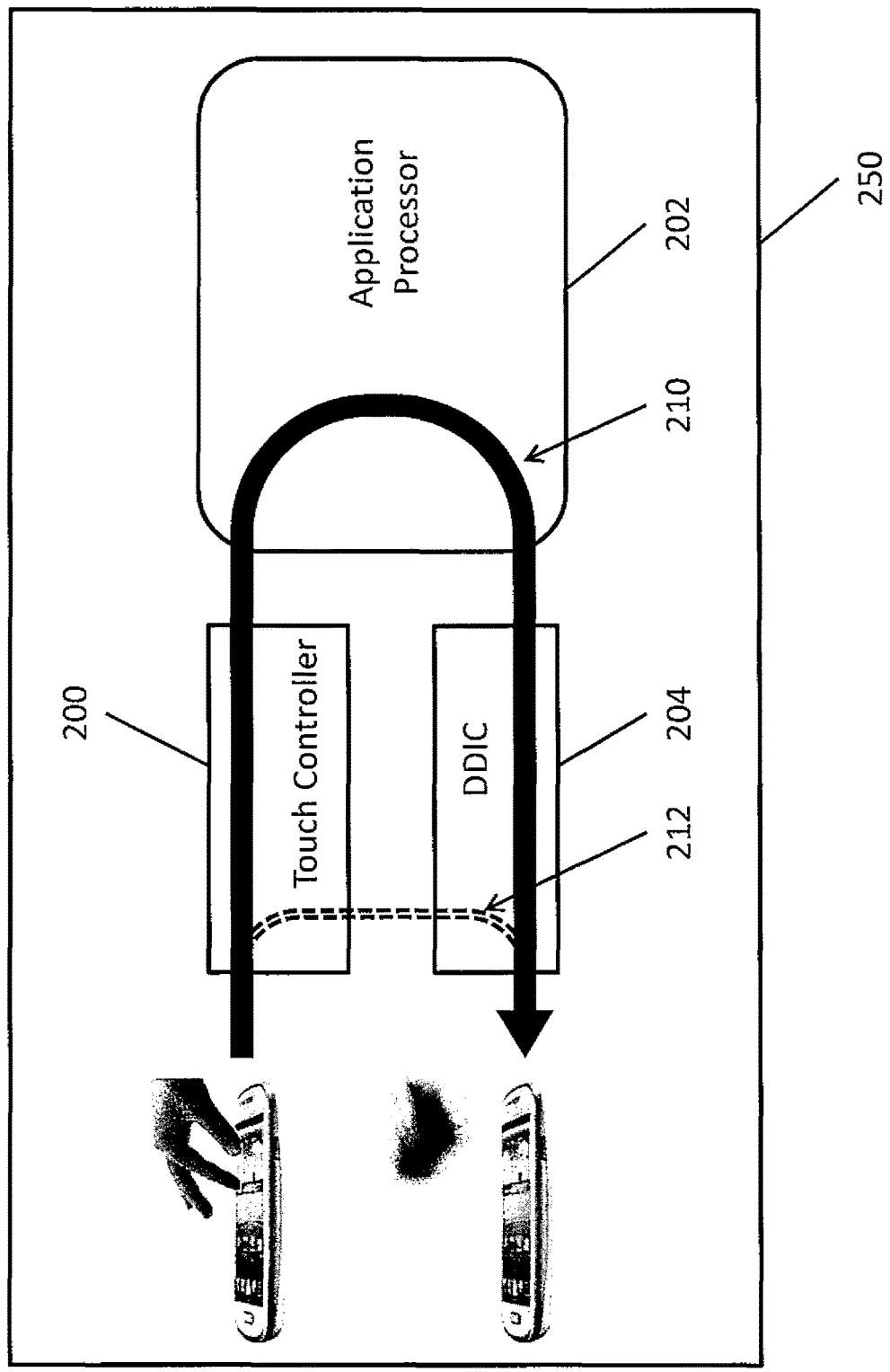
FIG. 2 is a schematic illustration of both a low latency feedback path and a related art feedback path according to one aspect of embodiments of the present invention.

Referring to FIG. 2, in a computing device 250, as an alternative to related art systems, embodiments of the present invention are directed to a low latency overlay system (which may be referred to as an "accelerator" or "visual feedback accelerator") that provides visual feedback immediately or more quickly over a low latency path 212 through a touch controller 200 and a display driver interface controller (DDIC) 204, followed by visual images at longer levels of latency over a longer latency path 210 through an application processor 202.

Figure 3:
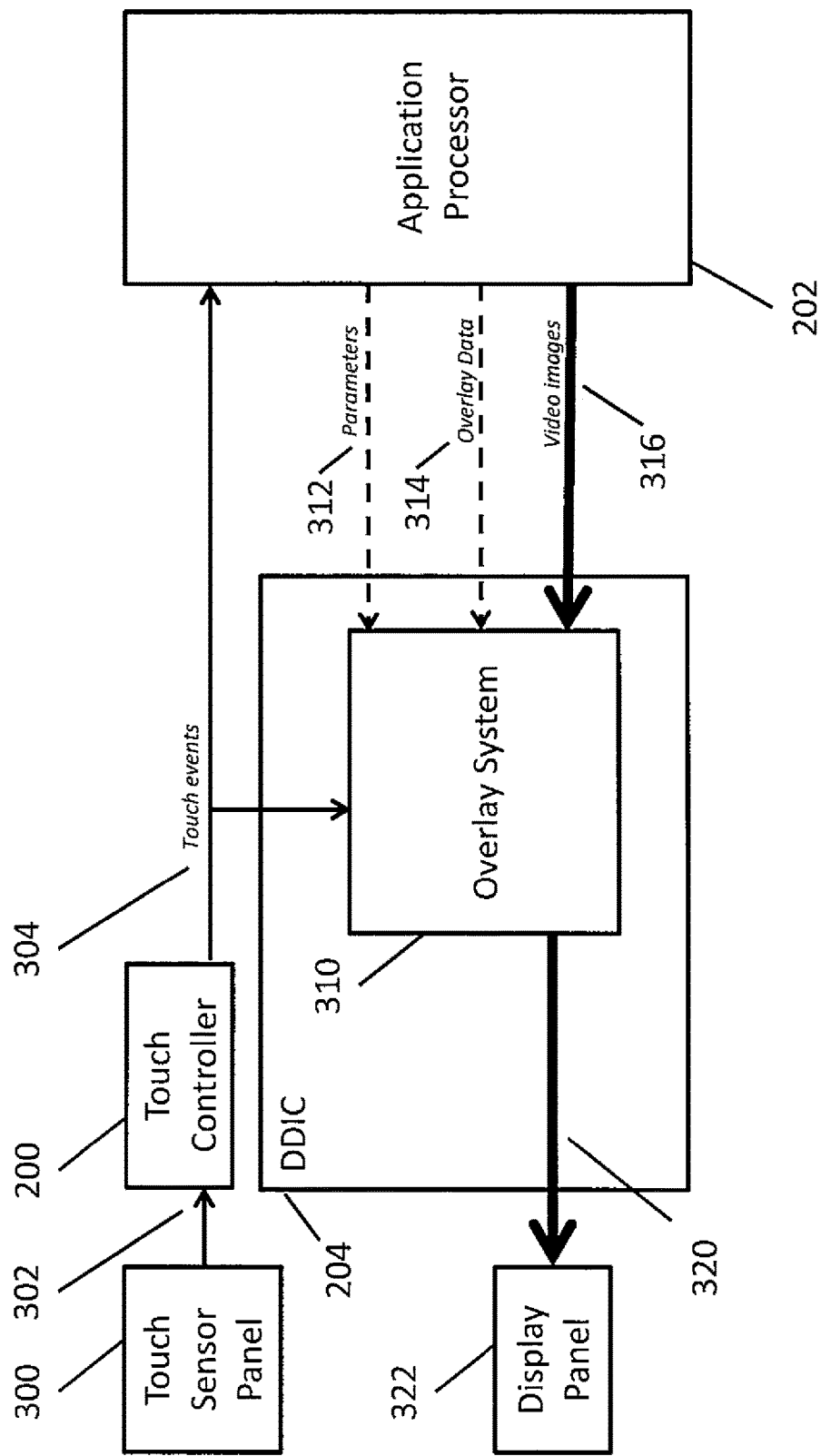
FIG. 3 is a block diagram illustrating a device including a low latency overlay system according to one embodiment of the present invention.

Referring to FIG. 3, typically a touch screen system and display system operate independently. A touch controller 200 processes the touch signals 302 from a touch sensor panel 300 and outputs the touch events 304, such as coordinates, to the application processor (AP) 202.

Referring to FIG. 3, a touch sensor panel 300 is configured to detect a user's touches and accordingly generates touch signals 302 which are supplied to the touch controller 200 over a data bus. Embodiments of the invention can be used with touch sensor panels 300 that detect user's touch using any type (or kind) of pointing implement, such as a body part (e.g., a finger), a stylus, etc. As used herein, the term "pointing implement" refers to objects that can be detected by a touch sensor panel 300 including devices (such as an active stylus or a passive stylus) and body parts (such as a finger or a hand). Embodiments of the present invention can be used with any of a variety of types (or kinds) of touch input panels such as resistive touch panels, surface acoustic wave touch panels, capacitive touch panels, infrared touch panels, or optical touch panels. In one embodiment, touch signals 302 correspond to the raw data supplied by the touch sensor panel 300, such as measurements of capacitance or voltage or current for each location in the touch sensor panel. In another embodiment, the touch signals 302 correspond to computed locations of touch based on processed raw data. The data bus for the touch events 304 is connected to both the AP 202 and the low-latency overlay system 310. The touch events 304 may be a stream of data values corresponding to locations at which touches by a user were detected (e.g., changes of capacitance or voltage or current of sufficiently high value to constitute the detection of a touch event). In some embodiments, the touch events 304 include pressure data indicating the pressure that was applied to the touch sensor panel.

The AP 202 processes the touch events 304, and application software running from the AP 202 updates the display composition accordingly, by rendering video images 316 (or frames or video images) to the DDIC 204 for displaying on a display panel 322. The AP 202 may include a central processing unit (CPU), a graphical processing unit (GPU), and memory. The display panel 322 may be, for example, an organic light emitting diode (OLED) display panel or a liquid crystal display (LCD) panel.

The AP 202 is connected to a DDIC 204 which, in turn, is connected to the display panel 322. The DDIC 204 receives the video images 316 from the AP 202 and supplies pixel driving signals 320 to the display panel 322.

In one embodiment, the touch sensor panel 300, the touch controller 200, the DDIC 204, and the display panel 322 are all components of a display module, which may be separate from the AP 202. In another embodiment, the touch sensor panel 300, the touch controller 200, the DDIC 204, and the display panel 322, or combinations thereof, may reside in separate modules, or be combined with the AP 202.

The DDIC 204 processes the video images (or frames of video images) 316 received from the AP 202, and outputs pixel driving signals 320 to the display panel 322.

The functions of the parameter 312 and the overlay data 314 will be described in more detail below.

According to embodiments of the present invention, the low-latency overlay system 310 processes touch events 304 with the video images 316 so that the display panel 322 shows the visual responses to the touch event faster than in related art implementations. In contrast to the approximately (or about) 6 frames or more display lag in some related art devices, embodiments of the present invention can reduce the lag to 1 to 2 frames.

Figure 4:
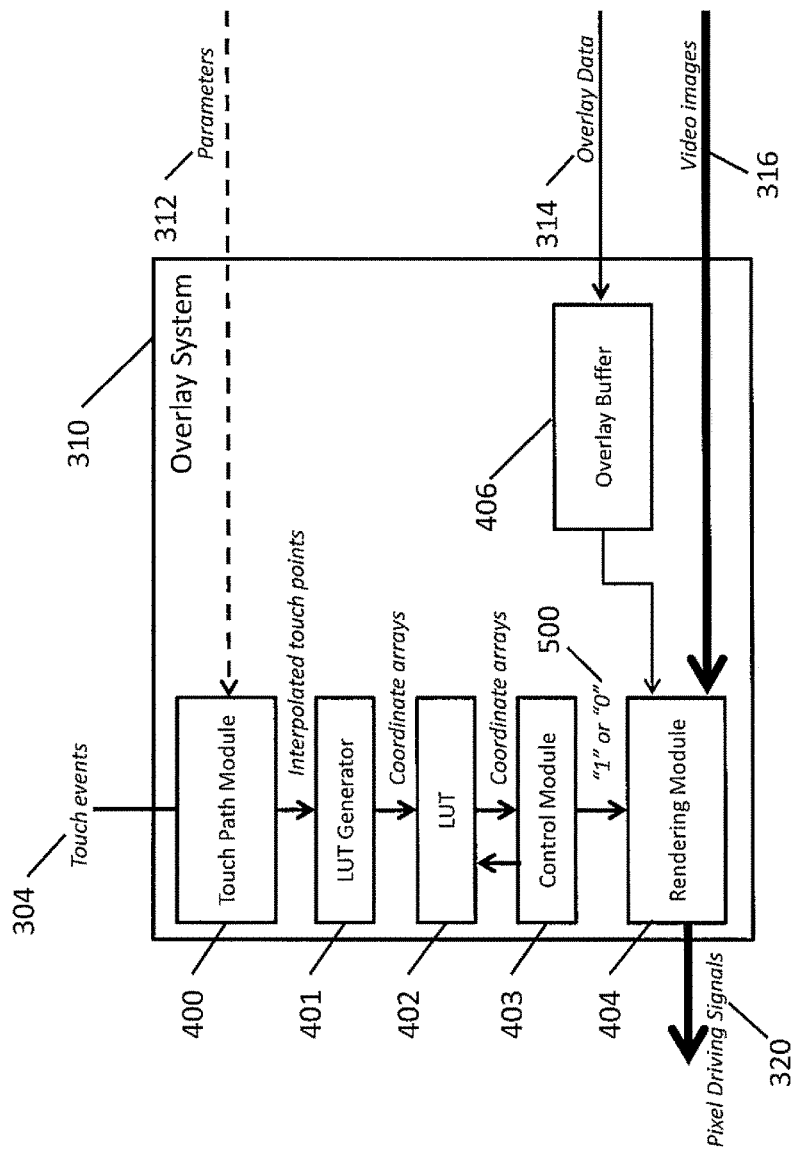
FIG. 4 is a block diagram illustrating the components within a low latency overlay system according to one embodiment of the present invention.

In more detail, FIG. 4 is a block diagram illustrating the components within a low latency overlay system 310 according to one embodiment of the present invention. Referring to FIG. 4, embodiments of the present invention include six parts: a touch path module (or logic) 400, a lookup table generator 401, a lookup table storage module 402, control module (or logic) 403, a rendering module (or logic) 404, and an overlay buffer 406. The overlay system 310 may be included as a component of a DDIC 204, or portions of the overlay system 310 may be included in a DDIC 204 or an AP 202 and other portions may be included in a touch controller 200.

As shown in FIG. 4, in one embodiment the touch path module 400 is connected to the touch controller 200 and receives touch events 304 from the touch controller 200. The touch path module 400 may also be connected to the AP 202 to receive configuration parameters 312. The touch path module 400 is also connected to lookup table generator 401, which generates values (or "coordinate arrays") that are stored in lookup table (or "LUT") 402. The control module uses the coordinate arrays stored in the LUT 402 to generate a mask on a row-by-row basis and supplies the mask 500 (e.g., as a bit stream of "1" and/or "0" values) to rendering module 404.

According to one embodiment, the overlay buffer 406 is a memory device within the DDIC 204 that is connected to the AP 202 and that stores overlay data 314 received from the AP 202. The overlay buffer 406 is configured to supply the stored overlay data 314 to the rendering module 404. However, embodiments of the present invention are not limited thereto. For example, in one embodiment, the overlay data 314 may be created internal to the overlay system 310 without inputs from the AP 202. In yet another embodiment, the overlay data 314 may be a combination of data created internal to the overlay system 310 and data corresponding to the inputs from the AP 202.

According to one embodiment, the rendering module 404 is coupled to the AP 202 and the overlay buffer 406 and is configured to combine the overlay data 314 with the video images 316 in accordance to the mask output by the control module 403. The output of the rendering module 404 is connected to the display panel 322 to supply the combined display images of the overlay data 314 and the video images 316 to the display panel 322 as pixel driving signals 320.

However, embodiments of the present invention are not limited thereto.

For example, in one embodiment, the touch path module 400, lookup table generator 401, LUT 402, control module 403, rendering module 404, and overlay buffer 406 are each implemented using different application specific integrated circuits (ASICs). In other embodiments of the present invention, various combinations of the various components (including all of the components) are implemented by a single ASIC (e.g., the touch path module 400, LUT generator 401, LUT 402, and control module 403 may all be implemented using the same ASIC). In still other embodiments of the present invention, a field programmable gate array (FPGA) is programmed to perform the functions of each of the touch path module 400, lookup table generator 401, LUT 402, control module 403, rendering module 404, and overlay buffer 406. In still other embodiments, the functionality of one or more of touch path module 400, lookup table generator 401, LUT 402, control module 403, rendering module 404, and overlay buffer 406 are implemented as components of the AP 202.

Furthermore, although the touch path module 400, lookup table generator 401, LUT 402, control module 403, rendering module 404, and overlay buffer 406 are shown in FIG. 4 as being components of the DDIC 204, embodiments of the present invention are not limited thereto. In some embodiments, one or more of touch path module 400, lookup table generator 401, LUT 402, control module 403, rendering module 404, and overlay buffer 406 (or components capable of performing these functions) are located within, for example, the touch controller 200, AP 202, or as a separate component. In addition, the components or the functions they perform may be located in different portions of the device. For example, the touch path module 400 may be implemented as a component or a function of the touch controller 200 and both the overlay buffer 406 and the rendering module 404 may be implemented as a component (or components) or a function (or functions) of the AP 202.

In addition, although the touch controller 200 is illustrated as a physically separate component, in some embodiments of the present invention the touch controller 200 is a portion of a larger integrated circuit. For example, the touch controller may be implemented is a same integrated circuit along with an AP 202 and/or a DDIC 204.

Figure 5A:
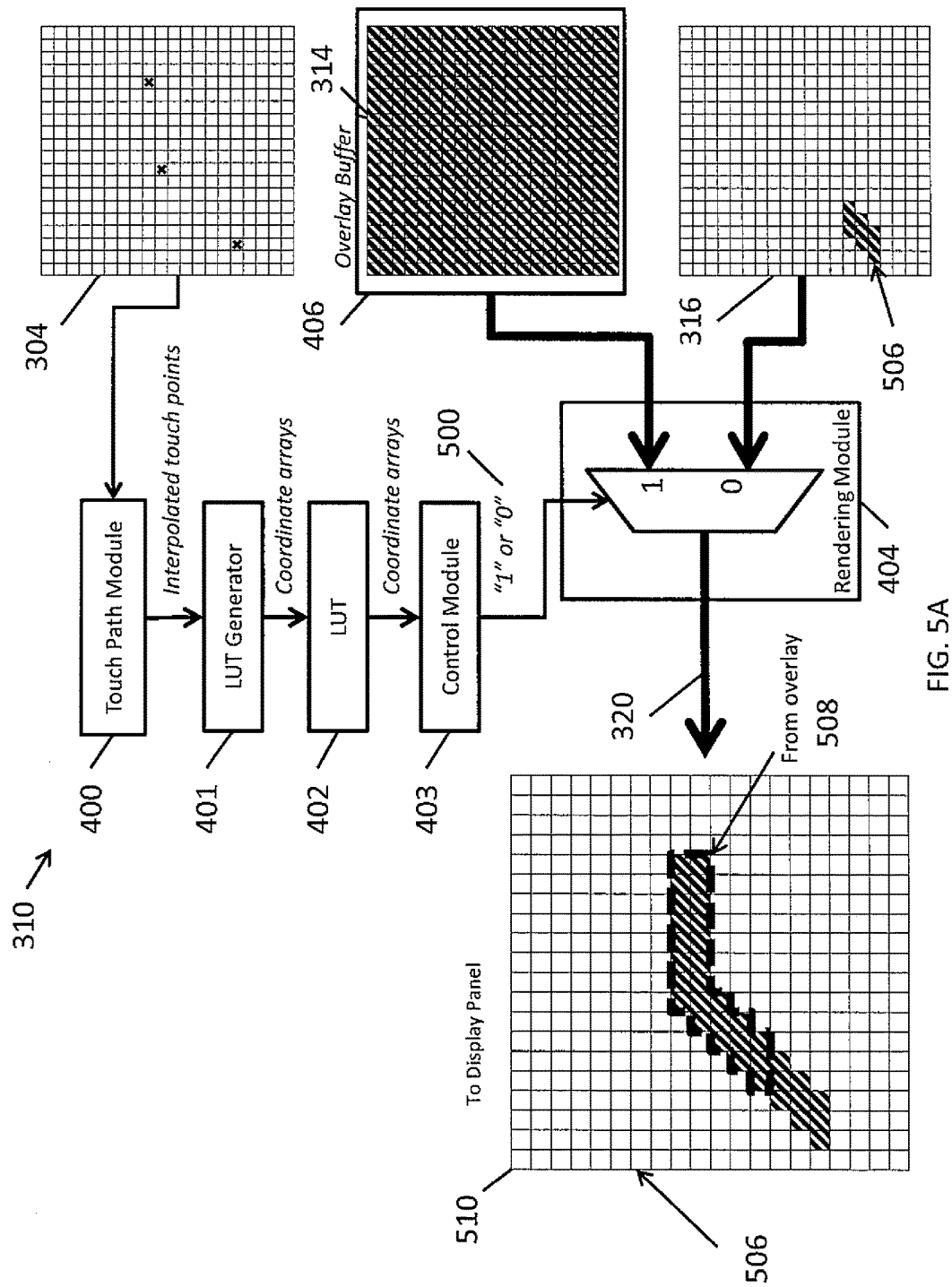
FIG. 5A is a schematic illustration of the combination of video image data, overlay data, and touch path information to generate a combined display image, in accordance with one embodiment of the present invention.

FIG. 5A is a schematic illustration of the combination of video image data 316, overlay data 314, and touch events 304 to generate a combined display image, in accordance with one embodiment of the present invention. Referring to FIG. 5A, the touch path module 400 processes the touch events 304 from the touch controller and generates and estimated touch path by interpolating and/or extrapolating between the locations of a subset of the received touch events, for example a set of successive touch events, over a number of previous consecutive frames (e.g., the past X frames). The estimated touch path (or "interpolated touch points") is then analyzed by the LUT generator 401 to generate a set of coordinate arrays that are stored in LUT 402. The control module 403 uses the coordinate arrays stored in the LUT 402 to generate a mask data 500 on a row-by-row basis and supplies the mask data 500 to the rendering module 404. The rendering module 404 combines the overlay data 314 stored in the overlay buffer 406 with the video image 316 from the AP 202 in accordance with the mask data output by the control module 403 to generate the combined display image 510 by selecting between (or blending) the overlay data 314 and the video images 316.

According to one embodiment, the control module 403 outputs mask data 500 on a row-by-row basis, where the mask data for a given row is an array of numerical values, wherein a position in the array corresponds to a position of a pixel in a row of the display panel 322 and wherein the relative positions of the values in the array correspond to the relative positions of the pixels in a row of the display panel 322 (e.g., the mask data may be thought of as a one dimensional array corresponding to a one dimensional map of the pixel positions in a row of the combined display image 510). According to one embodiment, each of the values of the mask data 500 is represented as a single bit, and the positions of the values in the mask data array correspond to positions in a row of the combined display image. Positions where the overlay data are to be shown in a given row of the combined display image have the values set to a first value (e.g., "1") and positions where the overlay data are not to be shown (e.g., where the video image data 316 are to be shown) have values set to a second, different value (e.g., "0"). The control module 403 may emit mask data in synchrony with supply of video data 316 from the AP 202 so that the mask data for a given row is supplied to the rendering module 404 while the rendering module 404 processing the corresponding row of the video data 316. The synchronization of the control module 403 with the video data 316 may be accomplished by supplying, to the overlay system 310, horizontal sync (HSYNC) and vertical sync (VSYNC) signals of the video data 316.

According to other embodiments of the present invention, each of the numerical values in the mask data 500 is represented by multiple bits (e.g., 8 bits), where the numerical value of the mask data refers to the "transparency" of the overlay data at each location in the display. As used herein, the term "transparency" denotes a blending (e.g., merging) of the overlay data 314 and the video image 316 such that the combined display image 510 takes on characteristics of both the overlay data 314 and the video image 316.

In one embodiment, for each video frame, the touch path module 400 generates the estimated touch path based on a subset of the touch events corresponding to a fixed number of video frames.

In another embodiment, the number of video frames is configurable to be in line with the display lag from AP 202.

In another embodiment, the touch path module 400 generates a touch path for a variable number of video frames. The number of video frames can be determined from an external module based on the past video images 316 from the AP 202.

A set of parameters 312 governs the characteristics of the estimated touch path when the path is generated. The parameters can have a start-up default, but may be adjusted as needed during run-time by software or other mechanisms. These parameters include, but are not limited to: width of path generated; style of line segments generated, such as simple straight segments or curves; region of the display wherein the path is allowed (e.g., the active drawing area); and the style of the rendering operation (e.g., antialiasing operations, smoothing operations, and transparency).

For example, when embodiments of the present invention are used in the context of a software application for drawing (e.g., a digital sketchbook), the overlay image segment 508 (which may also be referred to as computed portion 104), which is a portion of the combined display image 510, is only applied to portions of the display corresponding to the active drawing area. The overlay system 310 generally does not apply overlay data over portions of the display outside of the active drawing area. As such, parameters 312 can be set to restrict the estimated touch path to the portion of the display corresponding to the active drawing area. In another example, the parameters 312 can contain the line width of the drawn line. The touch path module 400 will use this parameter along with the pressure data from the touch events 304 to render the shape of the line in the mask data 500 ahead of the AP-generated line (or image segment) 506 from the AP 202. (The image segment 506 may also be referred to as the displayed line 100.)

In some embodiments of the present invention, the touch path module 400 supplies the line width and pressure information to the LUT generator. The LUT generator 401, rather than the touch path module 400, renders the shape of the drawn line.

As each pixel of the video image 316 is processed by the rendering module 404, the rendering module 404 retrieves a value in the mask data 500 wherein the position of the value in the mask data (e.g., the position in a matrix) corresponds to the location of the pixel in the video image 316, and performs a substitution of the pixel of the video image 316 with the overlay data 314 or a blending of the pixel of the video image 316 and the overlay data 314 in accordance with the value in the mask data 500 to achieve desired visual effects (e.g., transparency and/or antialiasing), and outputs either the overlay data 314 or the pixel of video image 316, or a blending thereof, to the display panel 322 via the pixel driving signal 320.

For example, in the substitution embodiment of this invention, the rendering operation of the rendering module 404 can be specified using a single bit as defined by the values in the mask data 500. The rendering operation selects the output of the rendering module to be either the video image 316 or the overlay data 314 for each pixel based on the value at the position in the mask data 500 corresponding to the position of the pixel in the combined display image 510.

In one embodiment of the present invention, the number of values of (or the size of) the mask data 500 equals the number of pixels in one row of the video images 316, which in turn equals the number of pixels in one row of the combined display image 510. Thus, there is a one-to-one relationship between each value in the mask data 500 and each pixel in a row of the video image 316. In other words, the substitution embodiment of the rendering module 404 is performed on a row-by-row basis by matching each value in the mask data 500 to a corresponding pixel in a current row of the video image 316 and outputting either the pixel of the video image 316 or the overlay data 314 to the display panel 322. For example, in one embodiment the rendering module 404 iterates through each value of the mask data 500. If a value of "0" exists at a particular position in the mask data 500, then the rendering module 404 outputs the corresponding pixel of the video image 316. On the other hand, if a value of "1" exists at a particular position in the mask data 500, then the rendering module 404 outputs the overlay data 314. As a result of the iterative process, the rendering module 404 outputs a row of the combined display image 510, as represented in the pixel driving signal 320, to the display panel 322. During each frame, the process iteratively operates on each row of the video images 316 to generate the entire combined display image.

In another embodiment of the present invention, the number of values in the mask data 500 may be less than the number of pixels in a row of a frame of video images 316. Thus, each value in the mask data 500 may have a one-to-many relationship to the pixels of video images 316 such that a value in the mask data 500 corresponds to multiple pixels of a video image 316, thereby reducing the size of the mask data 500 and reducing the memory requirements of the mask buffer 402.

In addition, in some embodiments, the same mask data 500 may be used for multiple rows, thereby also creating a one-to-many relationship between the values of the mask data and the pixels of the video images.

However, embodiments of the present invention are not limited thereto. In the blending embodiment of the present invention, the rendering operation of the rendering module 404 can be specified using multiple bits as defined by the values in the mask data 500. For example, the values in the mask data 500 may identify the level of blending (e.g., the level of transparency) to be rendered by the rendering module 404. In another example, if multiple rendering operations are supported by the rendering module 404, one or more bits of the values in the mask data 500 can be used to define the desired rendering operation, while other bits can be used to adjust the specifications of those rendering operations. The rendering module 404 can perform various rendering operations between the information carried in the video image 316 and the information carried in the overlay data 314, such as edge-enhance, dodge (lighten), burn (darken), etc. In other embodiments, the rendering operation may change the color or luminosity of portions of the video image 316, thereby generating a transparent coloring (or highlighter) effect or alpha compositing effect The rendering module 404 receives two inputs, the first input contains the video images 316 from the AP 202, and the second input contains the overlay data 314 from the overlay buffer 406. The overlay buffer 406 stores the overlay data 314 to be processed by the rendering module 404. The overlay data 314 can be provided by the AP 202 or created internally in the overlay system 310 wherein the characteristics of the overlay data 314 are determined by the desired output of the rendering module 404. In one embodiment, the characteristics (e.g., the appearance) of the overlay data 314 are matched to the characteristics (e.g., the appearance) of the video image 316 along the displayed line 100 such that when rendered according to the mask data 500, the combined display image 510 contains a seamless transition between the image segment 506 and the overlay image segment 508. These characteristics may include a color. For example, if the application software draws a black line, then the overlay data 314 would be provided by the AP 202 or internally created by the overlay system 310 to contain the same black color (e.g., a bitmapped image where all the pixels are black) as the software-drawn line. The rendering module 404 would output a combined display image 510 that contains a black line formed by adjoining the image segment 506 (e.g., the software-drawn black line) from the AP 202 and the overlay image segment 508 as determined by the mask data 500 and the overlay data 314. The overlay data 314 can also be textured or colored or may include bitmapped image data. Content of overlay data 314 can be dynamic over time and can be updated by the AP 202, or updated by a mechanism within the DDIC 204. The content can also be dynamic in size and shape.

In one embodiment of the present invention, multiple different sets of overlay data 314 representing multiple overlays can be stored in the overlay buffer 406, e.g., each set having a different color, different image, or different texture. These sets of the overlay data 314 may be referred to herein as "pages." In such embodiments, the values in the mask data 500 may also include information to allow the rendering module 404 to identify the specific page(s) of the overlay data 314 and to only use the identified page(s) during a rendering operation. As such, in some embodiments, the values of mask data 500 contain indices to the pages of the overlay data 314 to allow the rendering module 404 to switch among the different pages of the overlay data 314 during rendering operations.

In one embodiment of the present invention, the number of values of (or size of) each page of the overlay data 314 equals to the number of pixels in one frame of the video images 316 which in turn equals to the number of pixels in the combined display image 510. Thus there is a one-to-one relationship between each value of each page of the overlay data 314 and each pixel of the video image 316.

In another embodiment of the present invention, the number of values of (or size of) each page of the overlay data 314 may be less than the number of pixels in a frame of video images 316. Thus, each value of each page of the overlay data 314 may have a one-to-many relationship to the pixels of video images 316 such that a value of each page of the overlay data 314 corresponds to multiple pixels of a video image 316, thereby reducing the size of the overlay data 314 and reducing the memory requirements of the overlay buffer 406. For example, in some embodiments, the overlay data 314 contains a single color value such as an RGB (red green blue) color value where the entire overlay image (or overlay image segment) 508 is drawn as that single color value. In other embodiments, the different pages of the overlay data 314 are single values corresponding to single colors (e.g., different colors). In still other embodiments, single values may be intermingled with other pages that contain bitmapped images or other values within the overlay data 314.

Figure 5B:
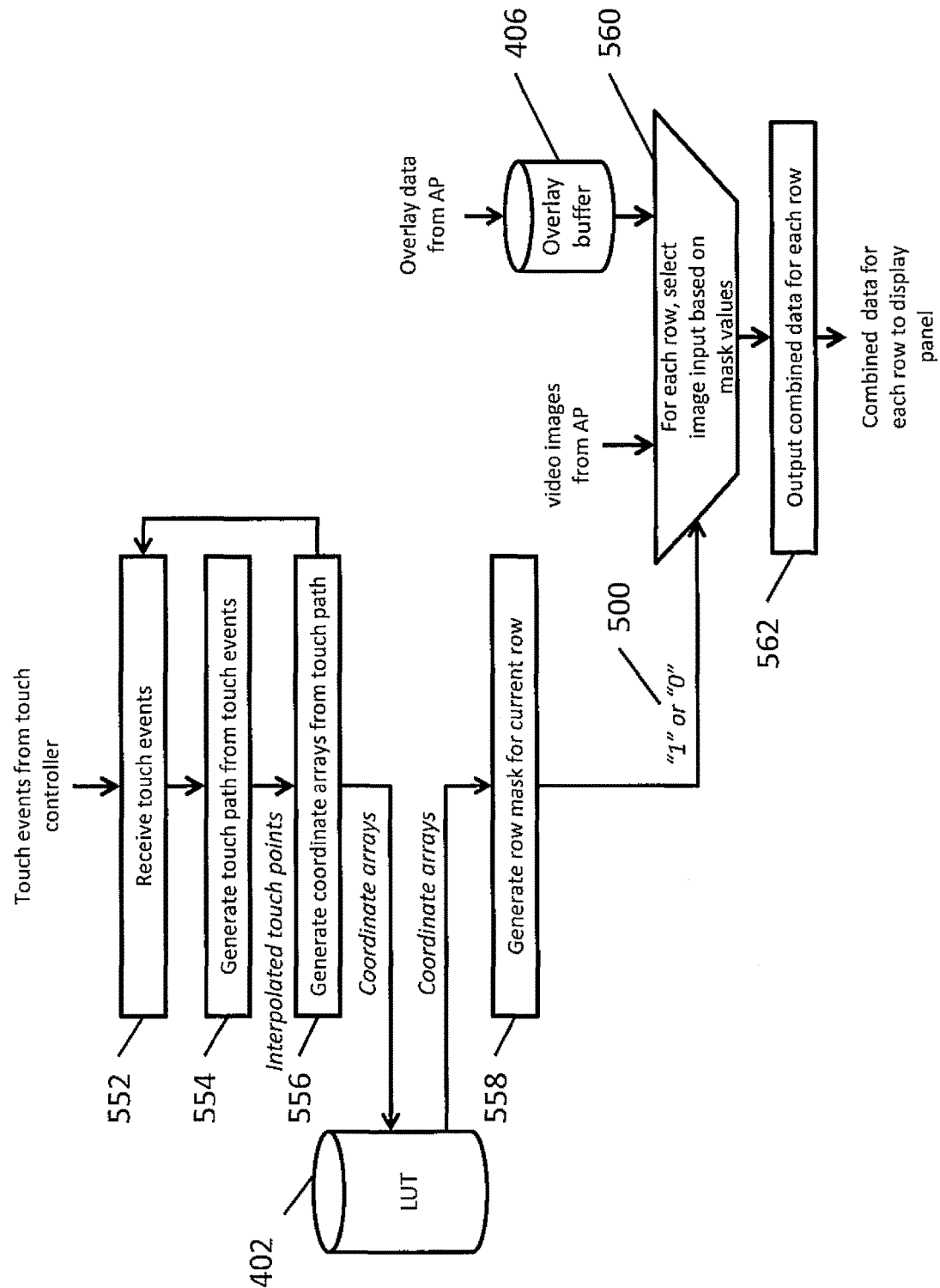
FIG. 5B is a flowchart illustrating a method for combining the overlay data with the video image to generate a combined display image in accordance with one embodiment of the present invention.

FIG. 5B is a flowchart illustrating a method for combining the overlay data with the video image to generate a combined display image in accordance with one embodiment of the present invention. Referring to FIG. 5B, according to one embodiment of the present invention, in operation 552, touch events are received from a touch controller 200. A touch path (or estimated touch path) is generated from the touch events in operation 554 by the touch path module 400 by, for example, interpolating or extrapolating between the touch events. The interpolated touch points are processed by the LUT generator 401 in operation 556 to generate coordinate arrays, which are stored in the LUT 402. In operation 558, the control module 403 generates mask data 500 for each row using the coordinate arrays stored in the LUT 402, where the mask data indicates whether the corresponding pixel of the combined display image should contain either overlay data from the overlay buffer 406 or video image data from the AP 202, or a blended combination thereof.

In operation 560, the values of the mask data 500 corresponding to the positions of the currently-being-processed row of the pixels in the display panel is used by the rendering module 404 to selectively output either the overlay data from the overlay buffer 406 or the video image from the AP 202, or a blending thereof.

In operation 562, the combined row of the display image is output and supplied to the display panel to display the overlay data 314 in composition with the video image for the given row. The process is applied to each row of the image to generate the combined data (or an entire combined image frame).

Figure 6A:
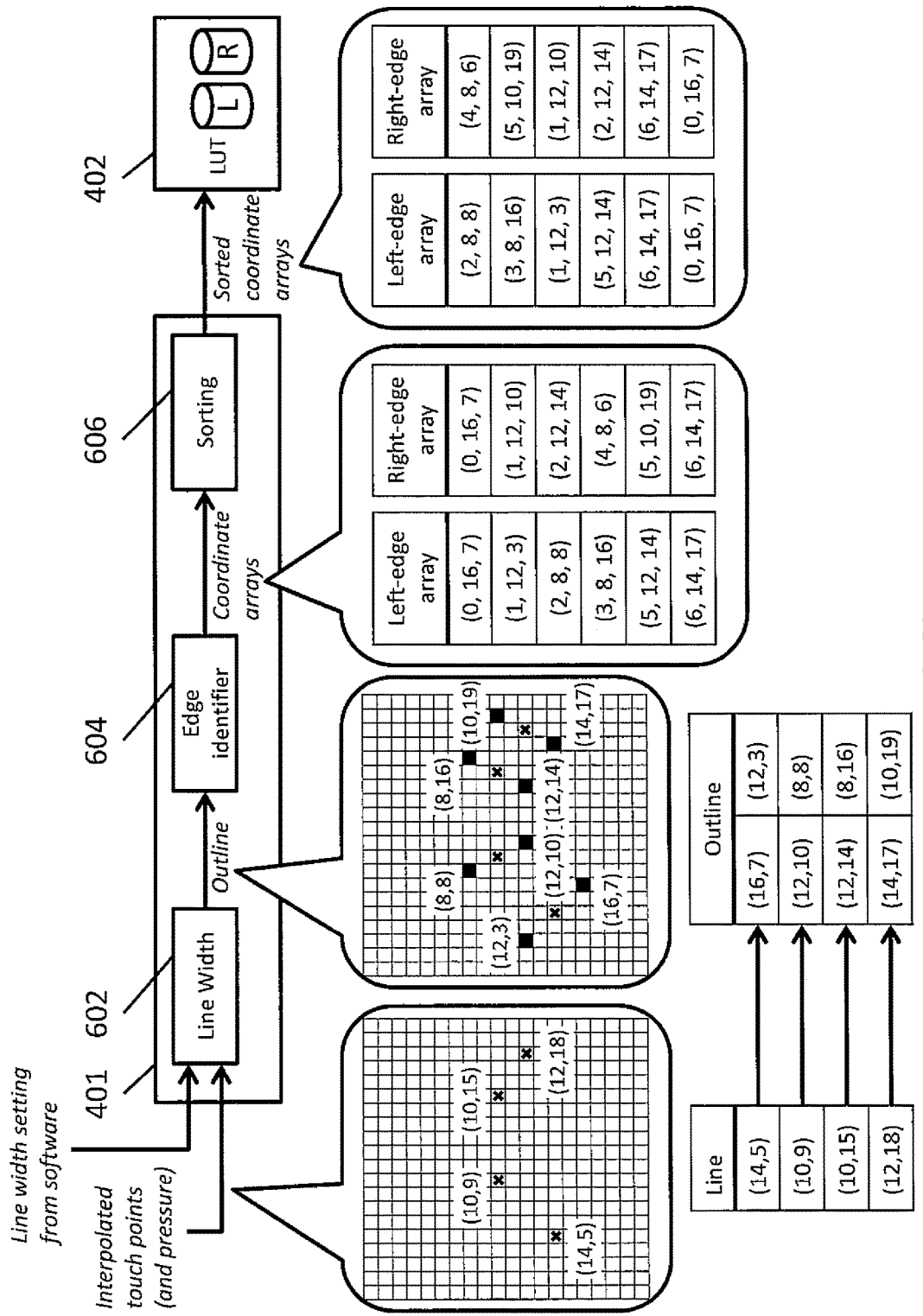
FIG. 6A is a schematic illustration of a lookup table generation module according to one embodiment of the present invention, the lookup table generation module being configured to generate lookup tables corresponding to a mask based on touch input data.

FIG. 6A is a schematic illustration of a lookup table generation module 401 according to one embodiment of the present invention. The lookup table generation module 401 is configured to generate lookup tables corresponding to a mask based on touch input data.

Figure 6B:
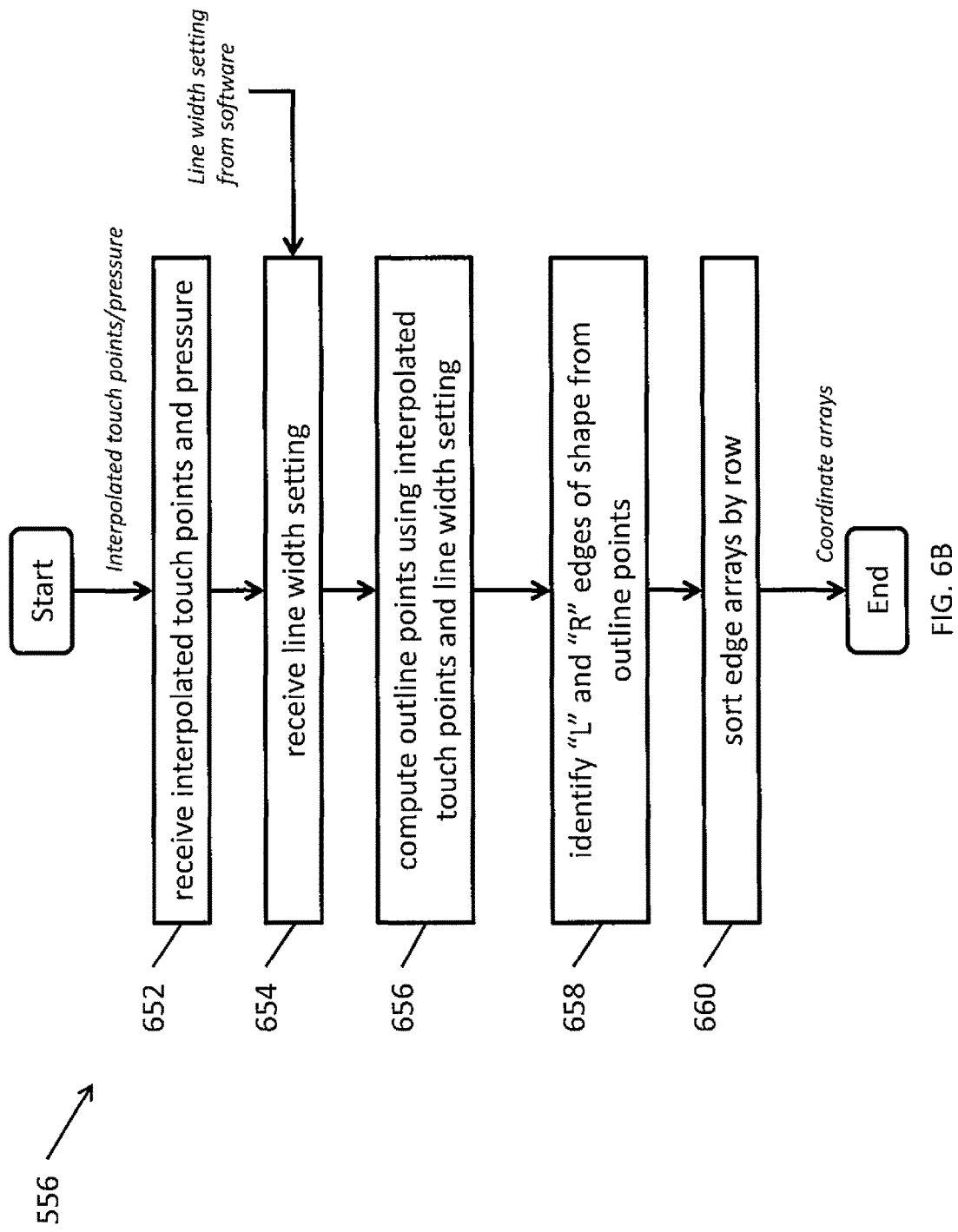
FIG. 6B is a flowchart illustrating a method for generating a lookup table based on touch input data according to one embodiment of the present invention.

FIG. 6B is a flowchart illustrating a method for generating coordinate arrays representing the shape of the line, to be stored in a lookup table based on touch input data, as in operation 556, according to one embodiment of the present invention.

Referring to FIGS. 6A and 6B, in operation 652 the line width module 602 of the lookup table generation module 401 receives interpolated points (and pressure information) from, for example, the touch path module 400. As shown in FIG. 6A, in a working example, the interpolated touch points of the line drawn by a user include coordinates [(14,5), (10,9), (10,15), (12,18)]. In operation 654, the line width module 602 also receives a line width setting from software (e.g., as one of the parameters 312 received from the AP 202).

In operation 656, the line width module 602 generates a set of points corresponding to a "widened" version of the line drawn by the user. In the working example shown in FIG. 6A, the line width setting is 4 pixels and the line width module 602 identifies coordinates that are 2 pixels (line width/2) away from the touch point along a direction perpendicular to the touch path. In one embodiment of the invention, the direction perpendicular to the touch path can be estimated by computing the inverse of the averages of the slopes between adjacent points.

For example, for the point (10,9), the slope from the previous touch point (14,5) to (10,9) is "1" because (14,5) is 4 columns to the right and 4 rows above (10,9) and 4/4=1. The slope to the next touch point (10,15) is "0" because it is in the same row as (10,9). Therefore, the average of the slope from the previous touch point and the next touch point is 1/2. As such, the slope of the line that is perpendicular to this slope is −2. The closest pixels that are 2 pixels away in either direction along a line passing through (10,9) with slope −2 are at (12,10) and (8,8).

For example, as shown in Table 1 below, each of the coordinates of the line are mapped to two pairs of coordinates:

TABLE 1

| Line | Outline | |
|---|---|---|
| (14, 5) | (16, 7) | (12, 3) |
| (10, 9) | (12, 10) | (8, 8) |
| (10, 15) | (12, 14) | (8, 16) |
| (12, 18) | (14, 17) | (10, 19) |

In some embodiments of the present invention, pressure information is also used to vary the width of the line at each touch point. For example, the pressure information can be used to scale the line width setting from the processor at each touch point such that the resulting line width is wider at locations of high pressure and set narrower at locations of low pressure.

As such, in operation 656, a set of outline points providing an outline of the shape of the mask to be generated. The outline points are supplied to an edge identifier module 604 of the LUT generation module 401.

Figure 7A:
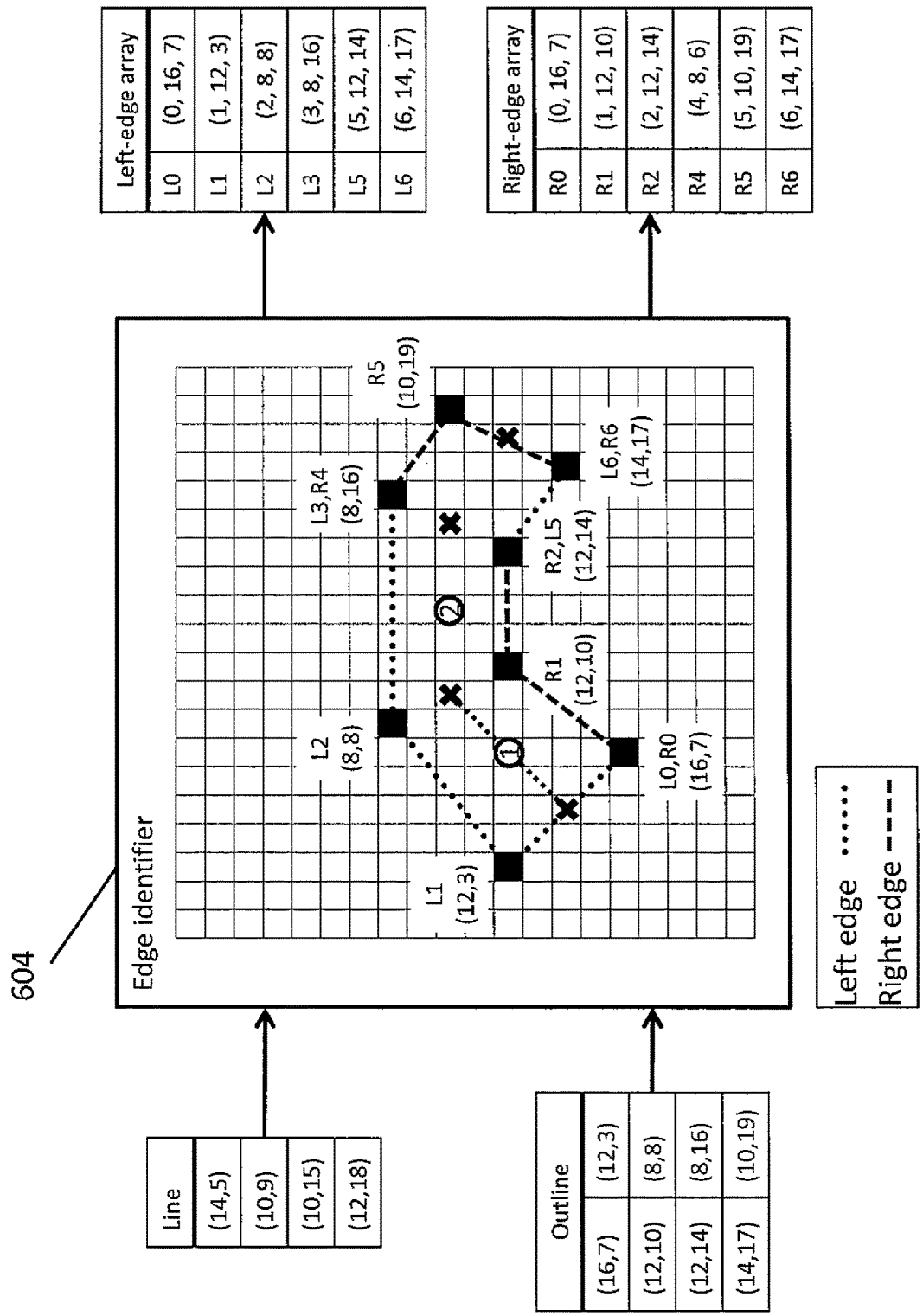
FIG. 7A is an illustration of a method for determining a set of "L" edges and a set of "R" edges of a shape based on coordinates of the outline of the shape according to one embodiment of the present invention.

In operation 658, the edge identifier module 604 identifies left-edge points (e.g. points that define a left edge of the outline; denoted as "L" points in FIG. 7A) and right-edge points (denoted as "R" points in FIG. 7A) from the outline points. The left-edge points define left edges that correspond to boundaries of the shape that are crossed when "entering" the shape from left to right. Similarly, the right-edge points define right edges that correspond to boundaries of the shape that are crossed when "exiting" the shape from left to right, where the original touch points (denoted by Xs in FIG. 7A) are deemed to be in the "interior" of the shape. The left-edge points are stored in a left-edge array and the right-edge points are stored in a right-edge array. In addition to points, each array also includes an index that is assigned (described below with reference to FIG. 7A).

In operation 660, the sorting module 606 sorts the left-edge points in left edge array and the right-edge points in the right edge array by the row coordinate to generate sorted coordinate arrays, which are then stored in the LUT 402.

FIG. 7A is an illustration of a method for determining a set of left edges and a set of right edges of a shape based on coordinates of the outline of the shape according to one embodiment of the present invention.

As shown in FIG. 7A, in one embodiment, the edge identifier 604 adds left-edge points that are part of the left edge to a left edge array and adds points that are part of the right edge to the right edge array. Some points corresponding to transitions between left and right edges appear in both the left and right edge arrays (e.g., (16,7), (12,14), (8,16), and (14,17) as shown in FIG. 7A). Each point in the left and right edge arrays is assigned an index. A gap in the index value occurs to indicate that two entries are disjointed. For example, the edges from (16,7) to (12,3), from (12,3) to (8,8), and from (8,8) to (8,16) are all "L" edges and therefore coordinates (16,7), (12,3), (8,8), and (8,16) are respectively labeled L0, L1, L2, and L3. However, the next "L" edge from (12,14) to (14,17) is disjoint from the other "L" edges. Therefore, there is no coordinate L4 and coordinates (12,14) and (14,17) are labeled L5 and L6, respectively.

Horizontal edges such as those from (8,8) to (8,16) and from (12,10) to (12,14) can be labeled as "L" edges or as "R" edges without any change to the result.

Figure 7B:
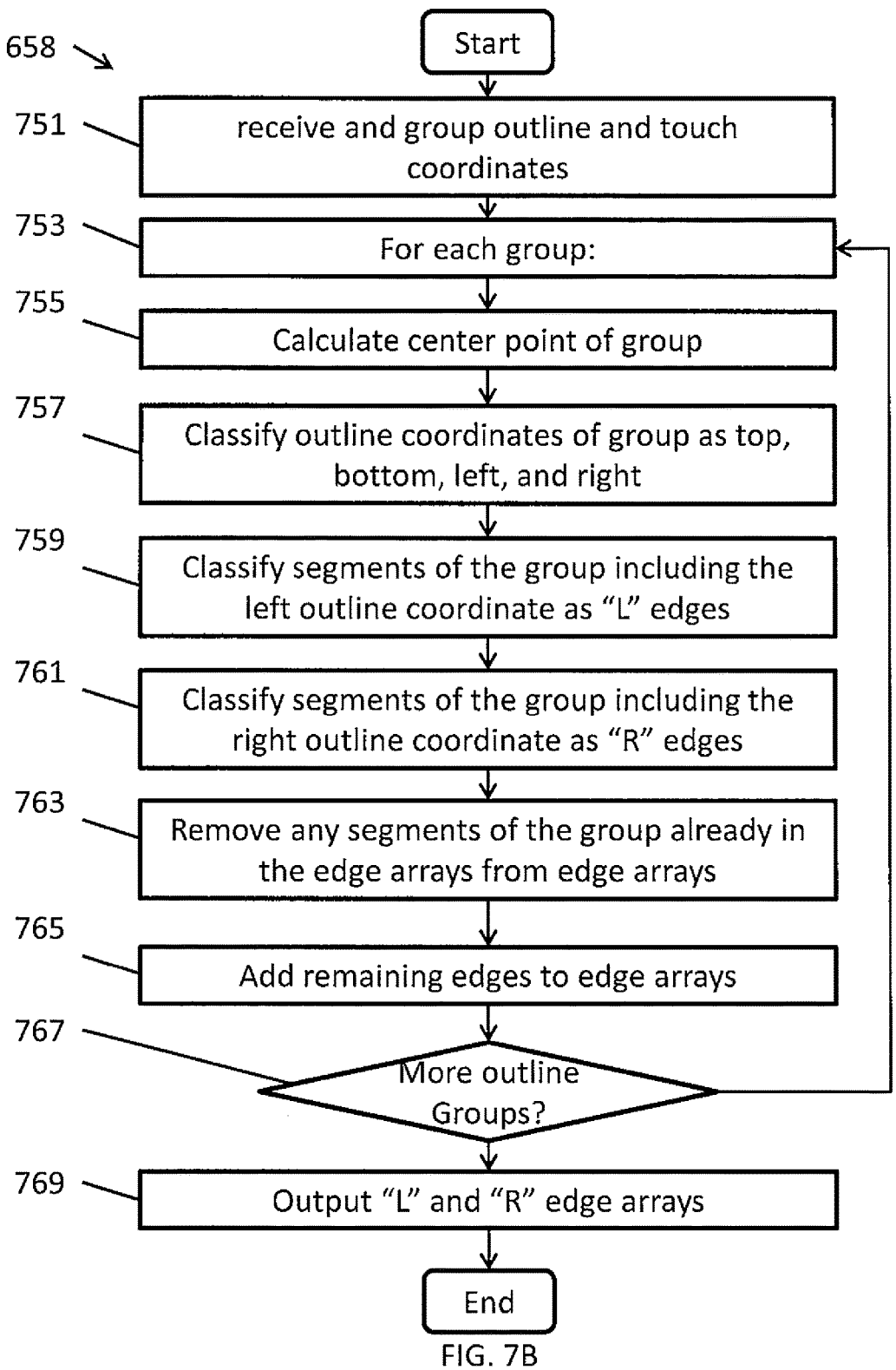
FIG. 7B is a flowchart illustrating a method for generating the set of "L" edges and the set of "R" edges of a shape based on coordinates of the outline of the shape according to one embodiment of the present invention.

FIG. 7B is a flowchart illustrating a method for generating the set of left edges and the set of right edges of a shape based on coordinates of the outline of the shape according to one embodiment of the present invention. Referring to FIG. 7B, in operation 751, the edge identifier 604 is configured to receive the coordinates corresponding to the line and corresponding to the outline from the line width module 602. The touch coordinates may be grouped in pairs of successive touch coordinates (e.g., the first group includes the first and second touch coordinates, the second group includes the second and third touch coordinates, and the third group includes the third and fourth touch coordinates) along with the corresponding outline coordinates (e.g., as shown in FIG. 7A, the first group includes points (12,3), (8,8), (16,7), and (12,10), the second group includes points (8,8), (8,16), (12,14), and (12,10), and the third group includes points (8,16), (10,19), (14,17), and (12,14)). Each of the groups is selected one at a time in operation 753. In operation 755, a center point is computed based on the midpoint between two adjacent touch coordinates. For example, as shown in FIG. 7A, the center point of the first group (labeled "1") is located at (12,7), the midpoint between the two touch points of the first group at (14,5) and (10,9).

In operation 757, the outline coordinates of the group are classified as being "top", "bottom", "left", and "right" coordinates, where each type of outline coordinate is classified as exactly one of the four types of coordinates. The coordinate having the smallest y value is classified as the "bottom" coordinate and the coordinate having the largest y value is identified as being the "top." In addition, the outline coordinate having the smallest x value is classified as "left" and the outline coordinate having the largest x value is classified as "right." If any points have the same y-value, either may be selected to serve as the "top" or "bottom" point. Similarly, if any points have the same x-value, either may be selected to serve as the "left" or "right" point. The points are then used to form line segments. In operation 759, segments that include the left coordinate (e.g., (12,3) for the first group in FIG. 7A) are classified as "L" edges (e.g., the segment between (12,3) and (8,8) and the segment between (12,3) and (16,7)) and in operation 761 all other segments are classified as "R" edges (e.g, the segment between (8,8) and (12,10) and the segment between (16,7) and (12,10)).

In operation 763, the identified segments are compared against edges already in the edge arrays. Because this is the first group, there are no existing edges in the edge arrays, so all four edges they are all added to the edge arrays in operation 765. In operation 767, the edge identifier 604 determines whether or not there are more groups to process. For example, the edge identifier may identify a second group based on the second and third touch coordinates (e.g., (10,9) and (10,15) in FIG. 7A) and the process may repeat for the second group. When processing the second group, one of the segments will connect points (8,8) and (12,10). Because that segment was already added to the right-edge array when processing the first group, that segment is removed from the right-edge array in operation 763 and is not reinserted in operation 765 because it is an "interior" edge (or interior to the shape).

After all of the groups have been processed, the left and right edge arrays are output in operation 769.

Figure 8A:
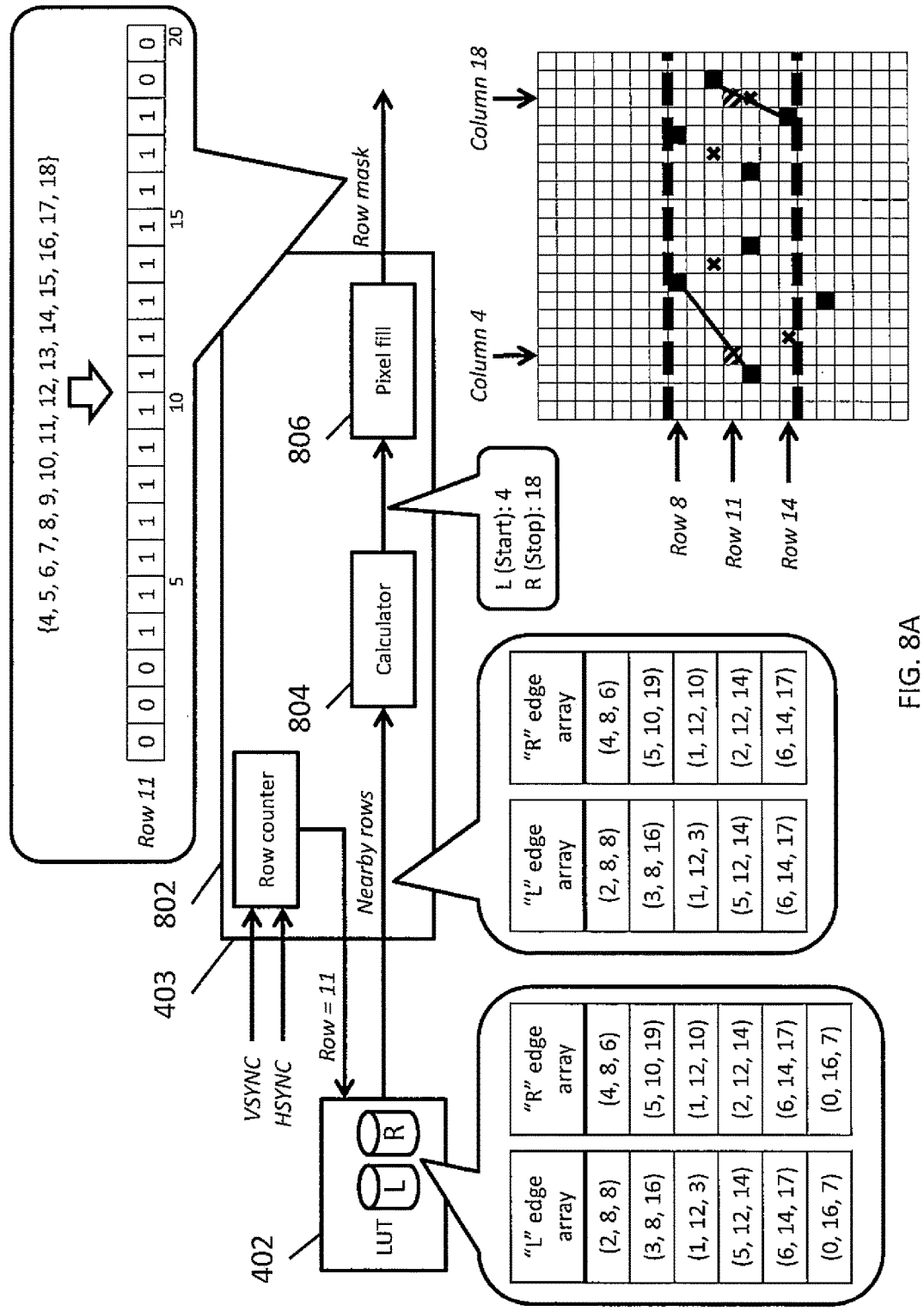
FIG. 8A is a schematic diagram of the generation of a row of a mask based on the lookup tables representing the shape according to one embodiment of the present invention.
Figure 8B:
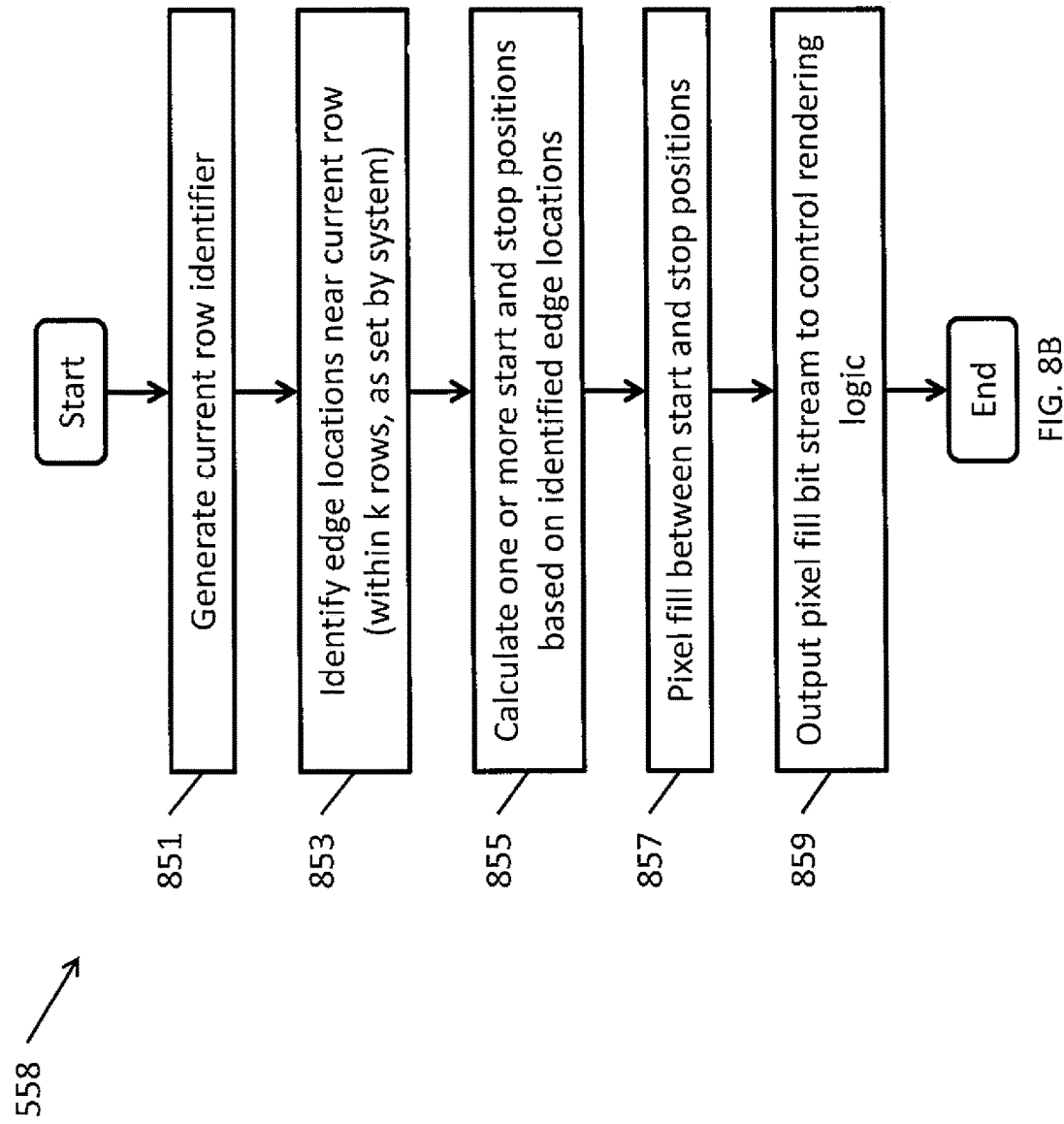
FIG. 8B is a flowchart illustrating a method for generating a row of a mask based on the lookup tables representing the shape according to one embodiment of the present invention.

FIG. 8A is a schematic diagram of the generation of a row of a mask based on the lookup tables representing the shape according to one embodiment of the present invention. In particular, FIG. 8A depicts the generation of the 11th row of the mask data as an example of operations that are used to generate all of the rows of the mask. FIG. 8B is a flowchart illustrating a method for generating a row of a mask based on the lookup tables representing the shape in operation 558 (see, e.g., FIG. 5B) according to one embodiment of the present invention.

Referring to FIGS. 8A and 8B, a row counter module 802 of the control module 403 receives HSYNC and VSYNC signals from an external source such as the AP 202. In operation 851, the row counter module 802 generates current row identifiers (e.g., counting from the first row until the last row) in sync with the HSYNC and VSYNC signals. For example, in one embodiment the row counter module 802 outputs a number r in response to receiving the rth HSYNC signal and resets the counter each time it receives a VSYNC signal, indicating the start of a new frame. As shown in the example of FIG. 8A, the row counter 802 is outputting "11" as the current row.

In operation 853, edge locations near the current row r are identified by finding entries in the LUT 402 where the row coordinates that are within k rows of the current row r (in other words, entries that fall between r−k and r+k). In the example of FIG. 8A, k is set to 3, so the LUT 402 returns the entries that are between rows 8 and 14 (indicated by the dotted lines in FIG. 8A) and excludes (16,7) because row 16 is out of the range of nearby rows.

The left and right edge arrays are supplied to calculator 804, and in operation 855, the calculator 804 calculates one or more start and stop positions based on the identified edge locations. To identify the start and stop positions, the calculator 804 identifies edges from among the nearby rows by identifying adjacent points (e.g., points that have consecutive first values, such as (2, 8, 8) and (3, 8, 16)). The calculator 804 then determines whether each of those edges crosses the current row and, if so, the column at which at which the edges cross the current row (e.g., the edge between (1,12,3) and (2,8,8) crosses row 11 at column 4). The start and stop positions are then collected and sorted by column number and supplied to the pixel fill module 806.

Figure 9:
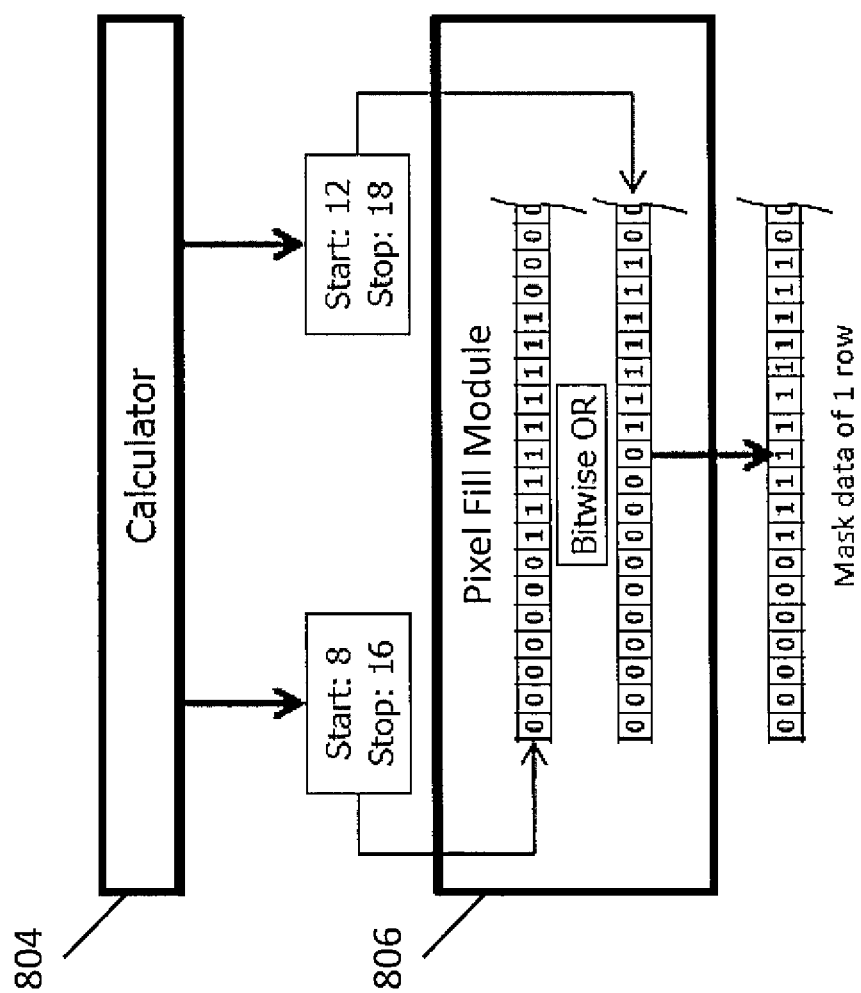
FIG. 9 is a schematic diagram illustrating the operation of the pixel fill module when generating a row of a mask based on the output of a calculator according to one embodiment of the present invention.

FIG. 9 is a schematic diagram illustrating the operation of the pixel fill module 806 when generating a row of a mask based on the output of a calculator according to one embodiment of the present invention. The pixel fill module 806 receives the start and stop positions from the calculator and outputs mask data of one row, having a length equal to the length of the mask. In one embodiment, in operation 857, the pixel fill module 806 performs a pixel fill operations by initializing an array to a first value (e.g., "0") and then setting all of the bits from the start position until the stop position to a second value (e.g., "1"). In another embodiment, the pixel fill module 806 iteratively sets each of the values in the array to the first value or the second value, in accordance with whether the current position is between the start and stop positions or not.

In one embodiment, there are multiple start and stop positions and, as such, the pixel fill module 806 calculates multiple arrays for each row. The pixel fill module 806 combines the multiple arrays using a bitwise or operation.

In operation 859, the pixel fill module 806 outputs the pixel filled bit stream as mask data of one row to control rendering module 404. As described above with respect to FIGS. 5A and 5B, the mask data 500 is used to control the combination of overlay data 406 with video frames 316 in order to generate the combined data.

As such, embodiments of the present invention are directed to systems and methods for generating mask data for an overlay of a calculated touch path, where the mask data is stored in a lookup table and has reduced memory requirements.

Low-latency display images can be generated by combining information from mask data 500 generated from a touch path, overlay data 314 from an overlay buffer, and the high-latency video image from the AP 202. The touch path is calculated from touch events (e.g., outputs from the touch controller) recorded over time. The overlay data 314 can be provided by the AP 202 or generated in the overlay system.

The overlay characteristics can be dynamically adjusted, including but not limited to color, dimensions (e.g., width), persistence, shading, and timing. These adjustments may be provided by the AP 202 as a set of parameters or may be derived inside the overlay system, for example, by analyzing the video images from the AP 202). The adjustments can also be determined by touch behavior. For example, the width of the resulting line can be adjusted in accordance with the pressure applied to the touch sensor panel (e.g., the width parameter is proportional to the measured pressure of the touch events).

The display image is generated by the overlay system via the mask data 500, which is calculated from the touch path. The mapping and scaling parameters may be provided by the AP 202 or may be calculated inside the overlay system by, for example, analyzing the touch events or the video images from the AP 202.

The overlay data can be merged with the video images from the AP 202 at the pixel level by the rendering module. In one embodiment, pixel characteristics from the video images are substituted with pixel characteristics from the overlay data in accordance with the values of the mask data. In other embodiments, new pixel characteristics are created based on a blending of the respective pixel characteristics from the video images and the overlay data.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A system comprising:
one or more integrated circuits configured to provide:
a touch path module to receive a plurality of touch events and to generate an output based on the touch events; and
a rendering module to:
receive a video image;
receive the output of the touch path module;
determine a plurality of points defining a boundary of a shape, the shape being determined based on the output of the touch path module;
generate a mask in accordance with the shape;
combine the video image with overlay data in accordance with the mask to generate a combined display image; and
output the combined display image,
wherein the combined display image comprises a plurality of rows,
wherein each of the points comprises a row coordinate, the rendering module being further to:
classify the points as one or more of left-edge points and right-edge points;
sort the left-edge points by the row coordinate; and
sort the right-edge points by the row coordinate, and
the rendering module further, for a current row of the plurality of rows of the combined display image, to:
determine a start entry based on an left intersection between the current row and a left edge defined by a first left-edge point of the left-edge points and a second left-edge point of the left-edge points;
determine a stop entry based on a right intersection between the current row and a line defined by a first right-edge point of the right-edge points and a second right-edge point of the right-edge points;
generate a row mask comprising a plurality of entries for the current row based on the start entry and the stop entry; and
combine the video image with the overlay data for the current row in accordance with the row mask.

2. The system of claim 1, wherein the current row comprises a plurality of entries,
wherein each of the entries of the row mask has a first mask value or a second mask value,
the rendering module being further to, for each entry of the current row:
output the overlay data when a corresponding entry of the row mask has the first value; and
output the video image when the corresponding entry of the row mask has the second value.

3. The system of claim 2, wherein each of the entries of the row mask between the start entry and the stop entry has the first mask value.

4. The system of claim 1, further comprising a memory to store the left-edge points and the right-edge points in a lookup table.

5. The system of claim 1, wherein the rendering module is further to determine the plurality of points defining the boundary of the shape based on a line width parameter.

6. The system of claim 1, wherein the touch events comprise touch pressure information, and
wherein the rendering module is further configured to determine the plurality of points defining the boundary of the shape based on the touch pressure information.

7. A method for combining overlay data with a video image, the method comprising:
receiving the video image;
receiving a touch path from a touch path module;
determining a plurality of points defining a boundary of a shape, the shape being determined based on the touch path;
generating a mask in accordance with the shape;
combining the video image with the overlay data in accordance with the mask to generate a combined display image; and
outputting the combined display image
wherein the combined display image comprises a plurality of rows,
wherein each of the points comprises a row coordinate, and
wherein the method further comprises:
classifying the points as one or more of left-edge points and right-edge points;
sorting the left-edge points by the row coordinate;
sorting the right-edge points by the row coordinate;
determining a start entry for a current row of the rows based on a left intersection between the current row and a left edge defined by a first left-edge point of the left-edge points and a second left-edge point of the left-edge points;
determining a stop entry for the current row based on a right intersection between the current row and a right edge defined by a first right-edge point of the right-edge points and a second right-edge point of the right-edge points;
generating a row mask comprising a plurality of entries for the current row based on the start entry and the stop entry; and
combining the video image with the overlay data for the current row in accordance with the row mask.

8. The method of claim 7, wherein the current row comprises a plurality of entries,
wherein each of the entries of the row mask has a first mask value or a second mask value, and
wherein the combining the video image with the overlay data comprises,
outputting the overlay data when a corresponding entry of the row mask has the first value; and
outputting the video image when the corresponding entry of the row mask has the second value.

9. The method of claim 8, wherein each of the entries of the row mask between the start entry and the stop entry has the first mask value.

10. The method of claim 7, further comprising storing the left-edge points and the right-edge points in a lookup table.

11. The method of claim 7, further comprising determining the plurality of points defining the boundary of the shape based on a line width parameter.

12. The method of claim 7, wherein the touch path comprises touch pressure information, and
wherein the method further comprises determining the plurality of points defining the boundary of the shape based on the touch pressure information.

13. A system comprising:
a touch panel;
a display panel; and
one or more integrated circuits configured to provide:
an application processor;
a touch path module to receive a plurality of touch events from the touch panel and to generate an output based on the touch events; and
a rendering module to:
receive a video image from the application processor;
receive the output of the touch path module;

determine a plurality of points defining a boundary of a shape, the shape being determined based on the output of the touch path module;

generate a mask in accordance with the shape;

combine the video image with overlay data in accordance with the mask to generate a combined display image; and output the combined display image to the display panel, wherein the combined display image comprises a plurality of rows, wherein each of the points comprises a row coordinate, the rendering module being further to:

classify the points as one or more of left-edge points and right-edge points;

sort the left-edge points by the row coordinate; and sort the right-edge points by the row coordinate, and the rendering module further, for a current row of the plurality of rows of the combined display image, to:

determine a start entry based on an left intersection between the current row and a left edge defined by a first left-edge point of the left-edge points and a second left-edge point of the left-edge points;

determine a stop entry based on a right intersection between the current row and a line defined by a first right-edge point of the right-edge points and a second right-edge point of the right-edge points;

generate a row mask comprising a plurality of entries for the current row based on the start entry and the stop entry; and combine the video image with the overlay data for the current row in accordance with the row mask.

14. The system of claim 13, wherein the current row comprises a plurality of entries, wherein each of the entries of the row mask has a first mask value or a second mask value, the rendering module being further to, for each entry of the current row:

output the overlay data to the display panel when a corresponding entry of the row mask has the first value; and output the video image to the display panel when the corresponding entry of the row mask has the second value, wherein each of the entries of the row mask between the start entry and the stop entry has the first mask value.

15. The system of claim 13, further comprising a memory to store the left-edge points and the right-edge points in a lookup table.

16. The system of claim 13, wherein the rendering module is further to determine the plurality of points defining the boundary of the shape based on a line width parameter received from the application processor.

17. The system of claim 13, wherein the touch events comprise touch pressure information, and wherein the rendering module is further configured to determine the plurality of points defining the boundary of the shape based on the touch pressure information.

\* \* \* \* \*